Figure 1:
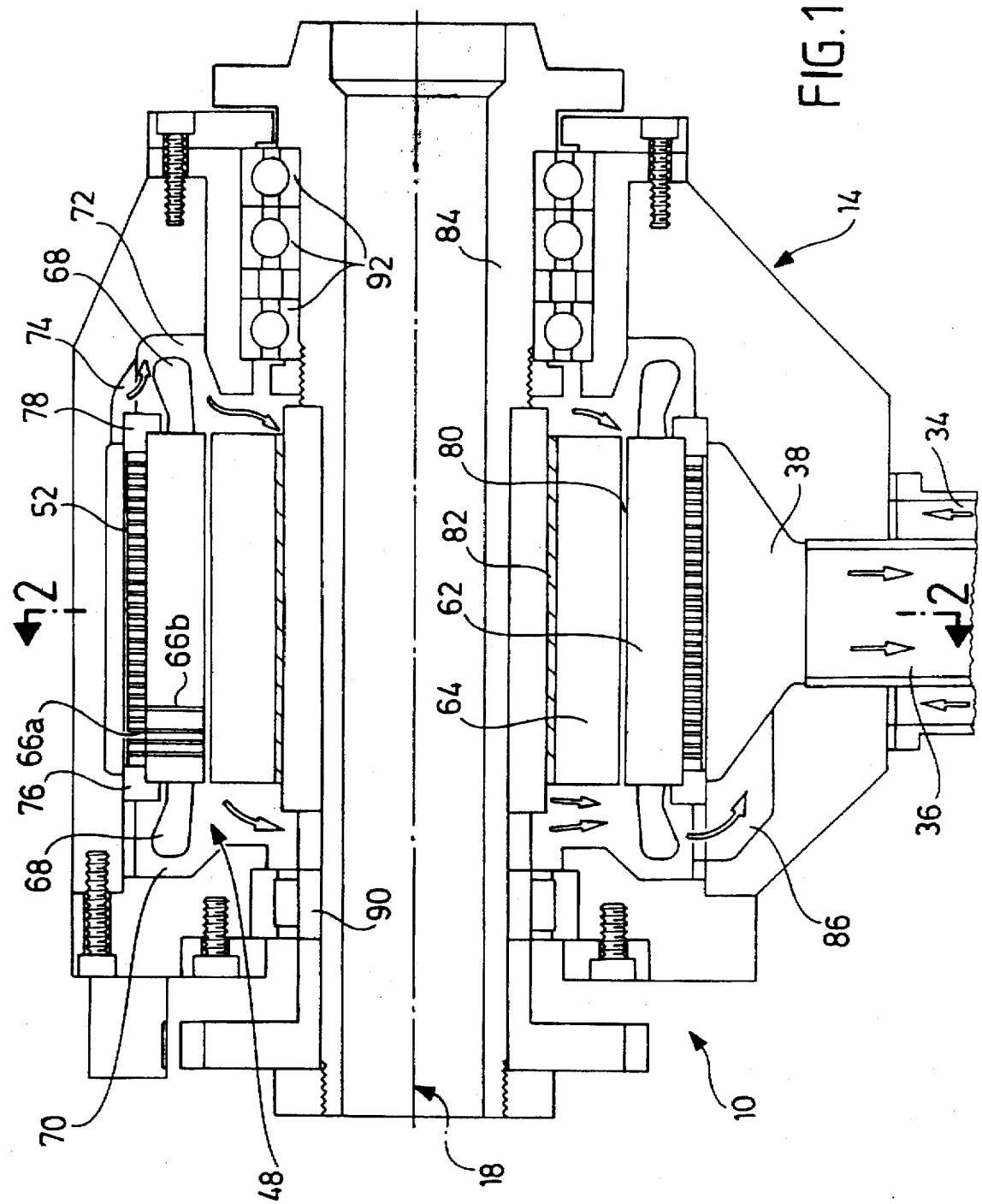

United States Patent [19]
Link et al.

[11] Patent Number: 5,664,916
[45] Date of Patent: Sep. 9, 1997

[54] COOLING SYSTEM FOR A MOTOR SPINDLE FOR A MACHINE TOOL

[75] Inventors: Helmut Friedrich Link, Aichwald; Walter Grossmann, Baltmannsweiler, both of Germany

[73] Assignee: Index-Werke GmbH & Co. KG Hahn & Tessky, Esslingen, Germany

[21] Appl. No.: 535,044

[22] PCT Filed: Mar. 17, 1994

[86] PCT No.: PCT/EP94/00843

§ 371 Date: Oct. 3, 1995

§ 102(e) Date: Oct. 3, 1995

[87] PCT Pub. No.: WO94/23485

PCT Pub. Date: Oct. 13, 1994

[30] Foreign Application Priority Data

Apr. 7, 1993 [DE] Germany ............... 43 11 431.8

[51] Int. Cl.$^6$ .................................................. B23B 19/00
[52] U.S. Cl. .......................... 409/135; 409/136; 409/231; 82/142; 310/54; 310/58; 310/59
[58] Field of Search ................................. 409/135, 231, 409/136; 310/54, 58, 59, 64, 67 R; 82/142

[56] References Cited

U.S. PATENT DOCUMENTS

| | | | |
|---|---|---|---|
| 2,343,875 | 3/1944 | Schwartz | 409/135 |
| 3,805,101 | 4/1974 | Purman | 310/54 |
| 4,133,230 | 1/1979 | Inaba et al. | 82/142 |
| 4,534,686 | 8/1985 | Nakamura et al. | 409/135 |
| 4,580,471 | 4/1986 | Oyama et al. | 82/142 |
| 5,062,330 | 11/1991 | Trautmann et al. | 82/147 |
| 5,088,362 | 2/1992 | Schalles | 82/142 |

FOREIGN PATENT DOCUMENTS

| | | | |
|---|---|---|---|
| 094680-A1 | 11/1983 | European Pat. Off. | |
| 415138-A2 | 3/1991 | European Pat. Off. | |
| 357533 | 12/1905 | France | |
| 1136444 | 12/1956 | France | 310/54 |
| 655366 | 4/1992 | France | |
| 574963 | 4/1933 | Germany | 310/54 |
| 1134189 | 12/1957 | Germany | |
| 1029919 | 5/1958 | Germany | 310/54 |
| 1126498 | 3/1962 | Germany | |
| 1926256 | 11/1970 | Germany | |
| 1-92048 | 4/1989 | Japan | 409/135 |
| 2-292155 | 12/1990 | Japan | 409/135 |
| 4-2438 | 1/1992 | Japan | 409/135 |
| 4-2441 | 1/1992 | Japan | 409/135 |
| 337267 | 5/1959 | Switzerland | |

*Primary Examiner*—Daniel W. Howell
*Assistant Examiner*—Christopher Kirkman
*Attorney, Agent, or Firm*—Leydig, Voit & Mayer, Ltd

[57] ABSTRACT

Motor spindle cooled by coolant for a machine tool comprising a workpiece spindle and a drive motor having a rotor surrounding the workpiece spindle, concentric with the workpiece spindle and connected to the workpiece spindle, and a stator surrounding the rotor and concentric with the rotor, and comprising a spindle housing accommodating the drive motor and coolant channels surrounding the stator, at least one inner coolant channel enclosing the stator at least to a major extent and at least one outer coolant channel similarly enclosing the stator at least to a major extent being provided—in section through the three-phase motor perpendicularly to the spindle axis—for decoupling the spindle housing thermally from the drive motor, the outer coolant channel lying—in relation to the spindle axis—outside the inner coolant channel in the radial direction, and a coolant inlet being connected to a first end of the outer coolant channel, the second end of the outer coolant channel to a first end of the inner coolant channel, and the second end of the inner coolant channel to a coolant outlet.

22 Claims, 2 Drawing Sheets

COOLING SYSTEM FOR A MOTOR SPINDLE FOR A MACHINE TOOL

The invention relates to a motor spindle cooled by a coolant for a machine tool, in particular, for a single workpiece spindle of a lathe.

A so-called motor spindle is a combination of a work spindle, i.e., the shaft of a machine tool provided for holding a workpiece to be machined, with a drive motor comprising a stator and a rotor arranged coaxially with one another and with the axis of the work spindle, with the essentially annular stator surrounding the rotor which is similarly of essentially annular construction, and the rotor surrounding the work spindle, and the rotor being rotation-wise fixedly connected to the work spindle.

In machine tools such as lathes, it is extremely important to prevent heat generated by operation of the machine tool from bringing about temperature-related changes in the shape of machine components which impair the dimensional accuracy of workpieces machined on the machine tool. This problem arises particularly in connection with motor spindles in which a regulatable three-phase motor is directly integrated into a spindle housing in which the work spindle is mounted, as special attention must be paid there to removal of the dissipated heat from the motor, more particularly, not only because the motor is accommodated in the spindle housing, but, above all, also because the maximum motor power is often put to full use during operation of such motor spindles.

Various cooling systems for such motor spindles are, therefore, known from the prior art. Reference is made, only by way of example, to the solutions proposed in the following publications: German patent 3 844 337 and EP-0 415 138-A of INDEX-WERKE GmbH & Co. K G Hahn & Tessky, German patent 3 902 592, German patent 2 724 440 and EP-0 094 680-A.

All of these known constructions attempt to conduct as fully as possible the heat generated by the motor of a motor spindle away from the motor spindle with the aid of a flowing coolant, in particular, air. However, they have not proven fully satisfactory. In the applicant's experience, this is due to the fact that in the known constructions, above all, the stator of the drive motor in which the major part of the heat generated during operation occurs, is not adequately thermally decoupled from the spindle housing.

The object underlying the invention was, therefore, to eliminate this deficiency in the prior art as fully as possible, and departing from a motor spindle cooled by a coolant for a machine tool and comprising a workpiece spindle and a three-phase motor having a rotor surrounding the workpiece spindle axis, concentric with the workpiece spindle axis and rotation-wise fixedly connected to the workpiece spindle and a stator surrounding the rotor and concentric with the rotor, further comprising a spindle housing accommodating the three-phase motor and having the workpiece spindle mounted therein for rotational movement about the spindle axis, and also comprising coolant channels surrounding the stator, this object is accomplished in accordance with the invention in that —in section through the three-phase motor perpendicularly to the spindle axis—at least one inner coolant channel enclosing the stator at least to a major extent and at least one outer coolant channel similarly enclosing the stator at least to a major extent are provided, the outer coolant channel lying—in relation to the spindle axis—outside the inner coolant channel in the radial direction, and in that a coolant inlet is connected to a first end of the outer coolant channel, the second end of the outer coolant channel to a first end of the inner coolant channel and the second end of the inner coolant channel to a coolant outlet.

In the coolant system design according to the invention, the stator of the drive motor is thermally insulated from the spindle housing (this could also be the headstock of the machine tool) by the outer coolant channel. In this connection, it has to be borne in mind that it is the coolant that has not yet heated up or at most to an insignificant degree that is conducted in the outer coolant channel. The outer and inner coolant channels also prevent appreciable heat transfer due to radiation of heat from the stator to the spindle housing. If the coolant system of the motor spindle according to the invention is supplied with ambient air as coolant, the temperature of the spindle housing then corresponds to the ambient temperature, which eliminates changes in the shape of the spindle housing caused by increases in temperature with all their consequences for the mounting of the workpiece spindle and hence for the accuracy of workpieces machined on the machine tool. In section through the motor spindle, in particular, in a plane containing the spindle axis, the outer and/or the inner coolant channel is/are preferably just as long and wide as the stator of the drive motor. The two coolant channels are also preferably of the same width. In principle, it is, however, also possible for the width of the stator and the coolant channels to be selected so as to differ somewhat.

The coolant system of the motor spindle according to the invention is preferably designed for conducting air as coolant. This not only dispenses with a separate coolant source as ambient air simply has to be conducted through the coolant system of the motor spindle, but also offers a further advantage: As a pressure above atmospheric prevails in the cooling air in the spaces forming the coolant system of the motor spindle according to the invention and as it is of no consequence whatever if cooling air escapes from the spindle housing, i.e., if there are places in the spindle housing where leakage of the coolant can occur, with the use of air as coolant, dirt and cutting solutions used for workpiece machining can be prevented from penetrating into the motor spindle, particularly at those places at which the workpiece spindle emerges from the spindle housing.

In principle, a single outer and a single inner coolant channel could be provided. The outer coolant channel could, for example, extend from a coolant inlet on the spindle housing over almost 360° around the stator and then lead into the inner coolant channel likewise extending over almost 360° around the stator and then leading into the coolant outlet. However, a construction is more advantageous wherein provision is made for two inner and two outer coolant channels, each of which surrounds the stator in approximately half-shell-shaped configuration, with the second ends of the outer coolant channels being adjacent to one another and connected to the first ends of the inner coolant channels which are similarly adjacent to one another. The heating-up of the coolant along the outer coolant channels can thereby be minimized as the outer coolant channels are then shorter than a single coolant channel which almost completely surrounds the stator, and the cooling of the stator is also more effective with the shorter inner coolant channels.

Although coolant inlet and coolant outlet can be arranged at different places on the motor spindle or the spindle housing, embodiments in which coolant inlet and coolant outlet are arranged adjacent to one another are recommended. The resulting simpler design is particularly advantageous when the motor spindle according to the invention is not mounted on a machine frame but on a machine slide and so a special aspect of the invention is seen in a lathe comprising two opposed workpiece spindles, the spindle axes of which are in alignment with one another and at least one of which is designed as a motor spindle according to the invention and is advanceable towards the other to take over a workpiece.

If coolant inlet and coolant outlet are arranged adjacent to one another and two outer and two inner coolant channels are provided in the manner described hereinabove, it is particularly advantageous for the coolant outlet to be designed as a channel and to be surrounded by a channel of annular cross section forming the coolant inlet. In such an embodiment having a coolant inlet concentric with the coolant outlet, the two outer and inner coolant channels are connectable in a particularly simple way without any overlapping to the coolant inlet and the coolant outlet, respectively.

To bring about good transfer of heat from the stator to the coolant conducted in the inner coolant channel, it is proposed that the construction be designed such that stator laminations of the stator form on its outer circumference lamina-type cooling fins extending in the circumferential direction and projecting into the inner coolant channel. It is particularly advantageous for the stator laminations to form a set of laminae and for some of the stator laminations to extend to a greater extent in the radial direction than the other stator laminations. A set of stator laminations of such construction is known per se from German patent 3 844 337 of INDEX-WERKE GmbH & Co. K G Hahn & Tessky.

In order to form the outer coolant channel in a particularly simple way, it is proposed in a motor spindle whose spindle housing has an outer circumferential wall that the outer wall of the outer coolant channel be formed with this, i.e., that the construction be designed such that the outer circumferential wall of the spindle housing—in section through the motor perpendicularly to the spindle axis—delimits the outer coolant channel in the outward direction.

In a preferred embodiment of the motor spindle according to the invention, the stator is held on the spindle housing by way of annular insulating bodies with low thermal conductivity. The thermal separation of the stator from the spindle housing is thereby made more effective. To simplify the construction, it is proposed that, in this case, the insulating bodies be made to delimit the outer coolant channel in the direction of the spindle axis.

In a preferred embodiment of the invention, in order that the coolant flowing in the outer coolant channel will be heated up as little as possible by the heated coolant flowing in the inner coolant channel, a wall with heat-insulating properties is provided between outer and inner coolant channels. In analogy, in embodiments in which coolant inlet and coolant outlet are arranged adjacent to one another, it is proposed that a wall with heat-insulating properties be provided between coolant inlet and coolant outlet.

Since heat is also generated in the rotor of the drive motor, albeit to a lesser extent, it is recommended that a layer with heat-insulating properties be provided between rotor and workpiece spindle. For the same reason, and for cooling the rotor as well, and for more intensive cooling of the stator, it is recommended that an annular gap between stator and rotor be made to constitute part of the path along which coolant is conducted between coolant inlet and coolant outlet.

In the motors used for the motor spindles in question, the stator usually has windings which form projections, so-called winding heads, on both sides (seen transversely to the spindle axis) of the stator. To cool these winding heads, a particularly advantageous embodiment of the motor spindle according to the invention is designed so as to provide on at least one side of the three-phase motor an annular chamber which is part of the path along which coolant is conducted between coolant inlet and coolant outlet and into which the winding heads on the one stator side protrude. If such an annular chamber is provided on both sides of the three-phase motor, the coolant can also be forcibly conducted through both annular chambers by these being connected to one another by the annular gap between stator and rotor, in which case, the coolant is then also forcibly conducted simultaneously through this annular gap. In a particularly advantageous embodiment, in order to provide this path of the coolant system with the same pressure gradient, on the basis of which the coolant flows through the outer and the inner coolant channels, one of the aforementioned annular chambers is connected to the second end of the outer coolant channel and the other annular chamber to the second end of the inner coolant channel.

For thermal decoupling of the motor spindle from the machine part carrying it, whether it be the machine frame or a slide, it is recommended that a soft seal be arranged between the outflow end of the coolant inlet channel and the spindle housing and between the spindle housing and the inflow end of coolant outlet channel, respectively, particularly when the coolant outlet channel is formed by a pipe which is concentrically surrounded by a pipe forming the coolant inlet channel, for not only do the two soft seals then prevent transfer of heat, but also the still cool coolant between the outer and the inner pipes prevents transfer of heat from the heated coolant conducted in the inner pipe to the machine parts surrounding or holding the outer pipe.

Further features, advantages and details of the invention are apparent from the attached claims and/or the following description and the attached drawings of a particularly advantageous embodiment of the motor spindle according to the invention with adjacent coolant supply and exhaust lines.

Figure 2:
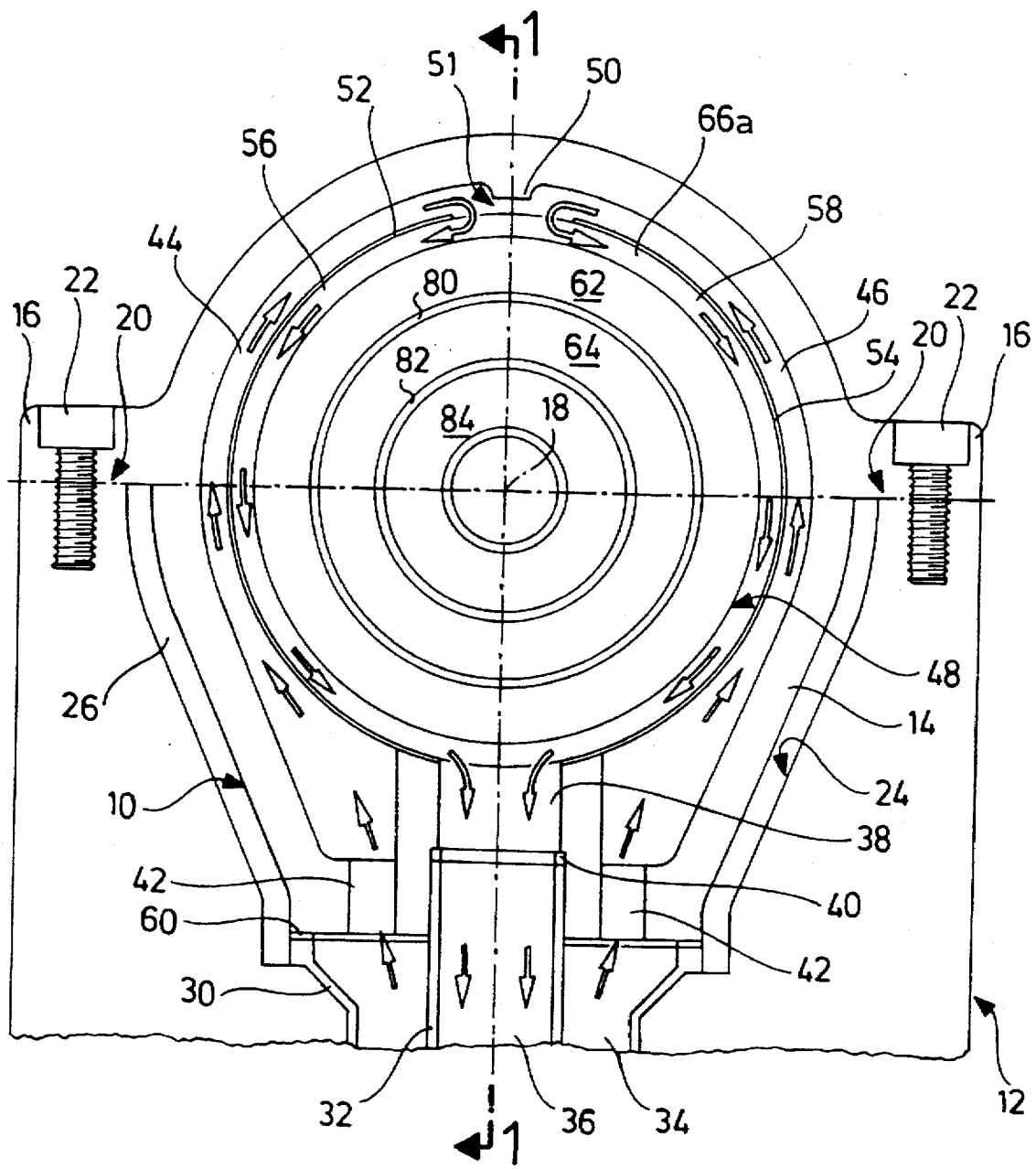

In the drawings:

FIG. 1 shows a section through the motor spindle and the regions of the coolant lines adjacent to it, more particularly, a section along a plane containing the axis of the workpiece spindle (section taken on line 1—1 in FIG. 2), and FIG. 2 a cross section corresponding to line 2—2 in FIG. 1.

FIGS. 1 and 2 show the motor spindle 10 according to the invention which, as shown in FIG. 2, is attached to a machine frame 12 of a machine tool. The type of attachment of the motor spindle 10 to the machine frame 12 (which could also be replaced by a machine slide) is also designed in a special way in accordance with the invention, more particularly, in such a way that a spindle housing 14 of the motor spindle 10 has formed on its two longitudinal sides attachment rails 16 which are diametrically opposed in relation to a spindle axis 18 and rest on attachment surfaces 20 of the machine frame 12 lying in a common plane and are attached to these by means of screws 22. The machine frame 12 (or in the case of a slide, the latter) is designed in accordance with the invention so as to have a recess 24 of such shape that a space 26 is created between the motor spindle 10 or its spindle housing 14 and the machine frame 12 so that the motor spindle 10 only has contact with the machine frame 12 at the attachment surfaces 20.

In accordance with the invention, two concentric pipes are inserted in the machine frame 12, namely an outer pipe 30 and an inner pipe 32. In particular, the latter is a heat-insulating plastic pipe.

An annular channel between the outer pipe 30 and the inner pipe 32 forms a coolant inlet channel 34, while the inner pipe 32 defines a coolant outlet channel 36. Leading into the latter is a coolant outlet 38 of the motor spindle which is formed by a bore of the spindle housing 14, and between the upper end of the inner pipe 32 according to FIG. 2 and a step of the stepped bore forming the coolant outlet 38 there is a soft sealing ring 40. Around the bore forming the coolant outlet 38 and at a distance from it, the spindle housing 14 has several channel-like openings 42, which connect the coolant inlet channel 34 with two outer coolant channels 44 and 46 which each surround a three-phase motor designated in its entirety 48 in FIG. 1 in half-shell-shaped configuration and, in particular, extend concentrically in relation to the spindle axis 18. As FIG. 2 clearly shows, the outer coolant channels 44, 46 are machined in accordance with the invention in the inner wall surface of the spindle housing 14 and terminate at a rib-shaped projection 50 of the spindle housing. Attached to the latter are two sheet metal jackets 52 and 54 which extend from the upper end of the coolant outlet 38 and each surround the spindle axis 18 in almost half-shell-shaped configuration. If possible, these should have heat-insulating properties and in the region of the projection 50 enclose between them a gap 51 which extends in the direction of the spindle axis 18 and corresponds approximately in length to the length of the motor 48. Between the sheet metal jackets 52 and 54 and the circumference of the motor 48 two inner coolant channels 56 and 58 are thus formed. These extend concentrically in relation to the outer coolant channels 44 and 46 and similarly surround the motor 48 in almost half-shell-shaped configuration.

While the lower, first ends of the outer coolant channels 44 and 46 according to FIG. 2 are connected to the coolant inlet channel 34, the upper, second ends of the outer coolant channels 44 and 46 are connected via the gap 51 to the upper, first ends of the inner coolant channels 56 and 58 according to FIG. 2, whose lower, second ends according to FIG. 2 lead into the coolant outlet 38.

Mention is also made of the fact that the outer pipe 30 is connected by way of a second soft sealing ring 60 to the spindle housing 14.

The three-phase motor 48 will now be explained in further detail hereinbelow with reference to FIG. 1.

The motor 48 consists essentially of a so-called stator 62 and a rotor 64 which are both of approximately circular configuration and are arranged concentrically in relation to the spindle axis 18. The design and operation of such a three-phase motor which is usually referred to as a hollow shaft motor are known. Therefore, the motor will only be described hereinbelow insofar as this is of relevance to the present invention.

The stator 62 comprises a set of, in the radial direction, (in relation to the spindle axis 18) long and short stator laminations 66a and 66b, respectively, which are stacked alternately on one another in the direction of the spindle axis 18 so the long stator laminations 66a extending into the inner coolant channels 56 and 58 form an extremely large cooling surface.

Only some of the stator laminations 66a and only a few of the stator laminations 66b are illustrated in FIG. 1. The stator 62 also has a winding which forms winding heads 68 which protrude from both sides of the actual stator body and extend into annular chambers 70 and 72 which are formed by the spindle housing 14 on both sides of the motor 48 and concentrically in relation to the spindle axis 18. The annular chamber 72 on the right according to FIG. 1 is connected to the second ends of the outer coolant channels 44 and 46, more particularly, via a channel 74 which leads in the region of the gap 51 into the outer coolant channels 44 and 46.

The stator 62 is held by the spindle housing 14 by way of two annular insulating bodies 76 and 78 with heat-insulating properties, and these two insulating bodies delimit the inner coolant channels 56 and 58 on their narrow sides, i.e., in the direction of the spindle axis 18.

Between the stator 62 and the rotor 64 there is an annular gap 80, and the rotor 64 is fixedly connected to a workpiece spindle 84 which is mounted in the spindle housing 14 for rotational movement about the spindle axis 18, more particularly, by way of an insulating layer 82 which has the shape of a hollow cylinder and heat-insulating properties. As FIG. 1 shows, the end of the workpiece spindle 84 on the right according to this Figure is designed for reception of a workpiece clamping device.

Accordingly, in accordance with the invention, coolant travels through the channel 74 into the annular chamber 72, flows from there through the annular gap 80 into the annular chamber 70 and finally arrives through a channel 86 of the spindle housing 14 in its coolant outlet 38 and hence in the coolant outlet channel 36 so not only the winding heads 68 are cooled by this flow of coolant, but also better cooling of the stator 62 is achieved, and also cooling of the rotor 64. If air is used as coolant, the illustrated construction has a further advantage: As the cooling air in the annular chambers 70 and 72 is under pressure above atmospheric—the cooling air is introduced into the coolant system according to the invention under pressure— it prevents penetration of dirt, cutting solutions and the like into the motor spindle at those points at which the workpiece spindle 84 emerges from the spindle housing 14 and by way of the bearings 90 and 92 by means of which the workpiece spindle is mounted in the spindle housing 14.

It follows from the above that the principle underlying the solution according to the invention can also be seen in the motor being surrounded by at least two coolant channels which are concentric with the spindle axis and with one another and through which coolant flows, one radially inner coolant channel thereof having coolant flowing through it which essentially brings about the cooling of the motor, while the radially outer coolant channel has coolant flowing through it which brings about a thermal decoupling of the motor from the spindle housing. These two coolant channels do not necessarily have to be connected in series, i.e., the principle underlying the solution according to the invention does not require the coolant to be conducted into the inner coolant channel after it has flowed through the outer coolant channel.

In the construction according to the invention, however, not only is the spindle housing thermally decoupled from the motor, but also the machine frame 12 or a machine slide in lieu of it is not immediately adjacent to areas in which heated coolant is conducted.

We claim:

1. A motor spindle unit with an integrated cooling system for use in a machine tool, the unit comprising:
    a spindle housing;
    a workpiece spindle mounted in said housing for rotation about a spindle axis;
    an electric three-phase motor accommodated by the housing and having a rotor and a stator, the rotor surrounding the spindle axis concentric therewith and being rotation-wise fixedly connected to the workpiece spindle, and the stator surrounding the rotor concentric therewith;
    the cooling system having a coolant inlet and a coolant outlet in flow communication with one another by at least one flow path for a coolant to be conducted in a predetermined flow direction along the flow path;

the flow path comprising a group of coolant channels with, in section through the motor perpendicularly to the spindle axis, (1) at least one inner coolant channel circumscribing the stator at least partially, and (2) at least one outer coolant channel circumscribing the stator at least partially and, with respect to the spindle axis, being located radially outside the inner coolant channel;

the group of coolant channels enclosing the stator at least to a major extent, and wherein a first end of the outer coolant channel is in flow communication with the coolant inlet, a second end of the outer coolant channel is in flow communication with a first end of the inner coolant channel, and a second end of the inner coolant channel is in flow communication with the coolant outlet so that within the outer and inner coolant channels the predetermined flow direction is oriented at least approximately in a circumferential direction with respect to the spindle axis.

2. The motor spindle unit according to claim 1, having two inner and two outer coolant channels each surrounding the stator in approximately half-shell-shaped configuration, the second ends of the outer coolant channels being adjacent to one another and connected to the first ends of the inner coolant channels, the first ends of the inner coolant channels being adjacent to one another.

3. The motor spindle unit according to claim 1, wherein the coolant inlet and the coolant outlet are adjacent to one another.

4. The motor spindle unit according to claim 3, wherein the coolant outlet is a channel surrounded by the coolant inlet.

5. The motor spindle unit according to claim 4, wherein the coolant inlet is a channel of annular cross section.

6. The motor spindle unit according to claim 1, wherein the stator has stator laminations providing lamina-type cooling fins at a circumferential periphery of the stator, the fins extending in the circumferential direction and projecting into the inner coolant channel.

7. The motor spindle unit according to claim 6, wherein the stator laminations form a set of laminae, with some of the stator laminations extending to a greater extent in the radial direction than the other stator laminations.

8. The motor spindle unit according to claim 1, wherein the spindle housing has an outer circumferential wall which, in section through the motor perpendicularly to the spindle axis, outwardly delimits the outer coolant channel.

9. The motor spindle unit according to claim 1, wherein the stator is held on the spindle housing by insulating bodies with low thermal conductivity.

10. The motor spindle unit according to claim 9, wherein the insulating bodies delimit the inner coolant channel in the direction of the spindle axis.

11. The motor spindle unit according to claim 1, wherein a wall located between the outer and the inner coolant channels has heat-insulating properties.

12. The motor spindle unit according to claim 4, wherein a wall located between the coolant inlet and the coolant outlet has heat-insulating properties.

13. The motor spindle unit according to claim 1, wherein a layer with heat-insulating properties is provided between the rotor and the workpiece spindle.

14. The motor spindle unit according to claim 1, wherein an annular gap between the stator and the rotor forms part of the flow path.

15. The motor spindle unit according to claim 1, wherein an annular chamber provided on at least one side of the motor forms part of the flow path.

16. The motor spindle unit according to claims 14, wherein annular chambers provided on both sides of the motor are connected to one another by the annular gap.

17. The motor spindle unit according to claim 15, wherein annular chambers provided on both sides of the motor are connected to one another by the annular gap.

18. The motor spindle unit according to claim 16, wherein one of the annular chambers is in flow communication with the second end of the outer coolant channel and the other one of the annular chambers is in flow communication with the second end of the inner coolant channel.

19. The motor spindle unit according to claim 17, wherein one of the annular chambers is in flow communication with the second end of the outer coolant channel and the other one of the annular chambers is in flow communication with the second end of the inner coolant channel.

20. The motor spindle unit according to claim 5, wherein a first soft seal is disposed between an outflow end of the coolant inlet channel and the spindle housing and a second soft seal is disposed between the spindle housing and an inflow end of the coolant outlet channel.

21. The motor spindle unit according to claim 1, wherein the outer coolant channel is formed in an inner wall of the spindle housing.

22. The motor spindle unit according to claim 1, wherein the spindle housing has alongside one another at least one coolant inlet opening and one coolant outlet opening, the spindle housing forming a partition wall between the coolant inlet opening and the coolant outlet opening, and wherein the coolant inlet opening is in flow communication with the first end of the outer coolant channel and the coolant outlet opening is in flow communication with the second end of the inner coolant channel.

* * * * *